United States Patent
Crawford

(10) Patent No.: US 10,160,552 B2
(45) Date of Patent: Dec. 25, 2018

(54) INLET ASSEMBLY FOR A TURBOFAN ENGINE

(71) Applicant: ROHR, INC., Chula Vista, CA (US)

(72) Inventor: Sara Christine Crawford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 278 days.

(21) Appl. No.: 15/043,117

(22) Filed: Feb. 12, 2016

(65) Prior Publication Data
US 2017/0233090 A1    Aug. 17, 2017

(51) Int. Cl.
*B64D 33/02*    (2006.01)
*F02C 7/045*    (2006.01)
*F02C 7/04*    (2006.01)

(52) U.S. Cl.
CPC .............. *B64D 33/02* (2013.01); *F02C 7/04* (2013.01); *F02C 7/045* (2013.01); *B64D 2033/0206* (2013.01); *B64D 2033/0286* (2013.01); *F05D 2220/323* (2013.01); *F05D 2230/50* (2013.01); *F05D 2240/14* (2013.01); *F05D 2260/96* (2013.01)

(58) Field of Classification Search
CPC . B64D 33/02; B64D 2033/0206; F02C 7/045; F05D 2220/323
See application file for complete search history.

(56) References Cited

U.S. PATENT DOCUMENTS

| | | | |
|---|---|---|---|
| 6,340,135 B1 * | 1/2002 | Barton | B64D 29/00 244/53 B |
| 8,152,461 B2 | 4/2012 | Howarth | |
| 8,267,642 B2 | 9/2012 | Binks | |
| 8,757,540 B2 | 6/2014 | Olver | |
| 2006/0145001 A1 * | 7/2006 | Smith | B64D 29/06 244/110 B |
| 2015/0260104 A1 | 9/2015 | Wilson | |

\* cited by examiner

*Primary Examiner* — Kevin Lee
(74) *Attorney, Agent, or Firm* — Cantor Colburn LLP

(57) ABSTRACT

A nacelle for a turbofan engine includes a fan case, an inner barrel and a nose lip generally concentrically disposed about an axis. The inner barrel projects forward from and is engaged to the fan case at a first split line. The nose lip is engaged to the inner barrel at a second split line, and extends substantially radially outward directly from the second split line, then substantially axially rearward to the fan cowl as one unitary piece.

20 Claims, 3 Drawing Sheets

INLET ASSEMBLY FOR A TURBOFAN ENGINE

BACKGROUND

The present disclosure relates to a turbofan engine nacelle, and more particularly to an inlet assembly of the nacelle.

Traditional inlet assemblies of a nacelle for a turbofan engine are generally centered about an engine axis. The inlet assembly is known to include an outer barrel projecting forward from a fan cowl, and an inner barrel projecting forward from a fan case. A substantially annular nose lip of the inlet assembly spans radially between and is attached to forward end portions of the inner and outer barrels. Each attachment location of the various parts forms a split line that may contribute toward airflow drag and thereby degrade nacelle performance.

SUMMARY

A nacelle for a turbofan engine according to one, non-limiting, embodiment includes a fan case concentrically disposed about an axis; an inner barrel projecting forward from and engaged to the fan case at a first split line; and a nose lip engaged to the inner barrel at a second split line, and wherein the nose lip extends substantially radially outward directly from the second split line then substantially axially rearward to the fan cowl as one unitary piece.

Additionally to the foregoing embodiment, the nose lip engages the second split line is disposed proximate to a stagnation point of the turbofan engine when operating at a pre-determined flight condition.

In the alternative or additionally thereto, in the foregoing embodiment, the nacelle includes a first bulkhead disposed between and engaged to the inner barrel and the nose lip.

In the alternative or additionally thereto, in the foregoing embodiment, the first bulkhead is axially spaced rearward of the second split line and axially spaced forward of the first split line.

In the alternative or additionally thereto, in the foregoing embodiment, the nacelle includes a fan cowl spaced radially outward from the fan case; and a second bulkhead extending substantially radially between and proximate to the first split line and a third split line located where the nose lip generally meets the fan cowl.

In the alternative or additionally thereto, in the foregoing embodiment, the second split line is disposed proximate to a stagnation point of the turbofan engine when operating at a pre-determined flight condition.

In the alternative or additionally thereto, in the foregoing embodiment, the pre-determined flight condition is cruising speed.

In the alternative or additionally thereto, in the foregoing embodiment, the fan case, the inner barrel and the one-piece nose lip define a generally annular cavity.

In the alternative or additionally thereto, in the foregoing embodiment, the nacelle includes a first bulkhead disposed in the cavity, extending between and engaged to the nose lip and the inner barrel, and spaced axially rearward from the second split line.

In the alternative or additionally thereto, in the foregoing embodiment, the nacelle includes a fan cowl spaced radially outward from the fan case; and a second bulkhead disposed in the cavity, and extending between the first split line and a third split line located where the nose lip meets the fan cowl.

In the alternative or additionally thereto, in the foregoing embodiment, the nacelle includes an inner flange connection disposed at the first split line for attaching the second bulkhead, the inner barrel, and the nose lip together; and an outer flange connection disposed at the third split line for connecting the nose lip to the second bulkhead, and wherein the second bulkhead extends between the inner and outer flange connections.

In the alternative or additionally thereto, in the foregoing embodiment, the outer flange connection is disposed axially forward of the inner flange connection.

In the alternative or additionally thereto, in the foregoing embodiment, the outer flange connection includes a landing for contact with the fan cowl.

In the alternative or additionally thereto, in the foregoing embodiment, the inner barrel is a one-piece inner barrel.

In the alternative or additionally thereto, in the foregoing embodiment, the inner barrel includes an acoustic feature extending axially forward of the first bulkhead.

In the alternative or additionally thereto, in the foregoing embodiment, the acoustic feature extends axially between and is proximate to the first and second split lines.

In the alternative or additionally thereto, in the foregoing embodiment, the third split line is disposed axially forward of the first split line.

In the alternative or additionally thereto, in the foregoing embodiment, the third split line is disposed axially forward of the first split line.

An inlet assembly for a turbofan engine according to another, non-limiting, embodiment includes an inner barrel centered about an axis and including a forward end portion and a rearward end portion; a nose lip generally centered about the axis and including a forward end portion engaged to and extending substantially radially outward from the forward end portion of the inner barrel at a split line, and a rearward end portion projecting substantially axially rearward and spaced radially outward from the rearward end portion of the inner barrel; and wherein the split line is proximate to a stagnation point of the turbofan engine when operating at a pre-determined flight condition.

Additionally to the foregoing embodiment, the inlet assembly includes a first bulkhead engaged to and spanning radially between the inner barrel and the nose lip, and wherein the split line is axially spaced forward of the first bulkhead; and a second bulkhead engaged to and spanning radially between the aft end portion of the inner barrel and the aft end portion of the nose lip, and wherein the second bulkhead is axially spaced rearward from the first bulkhead.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
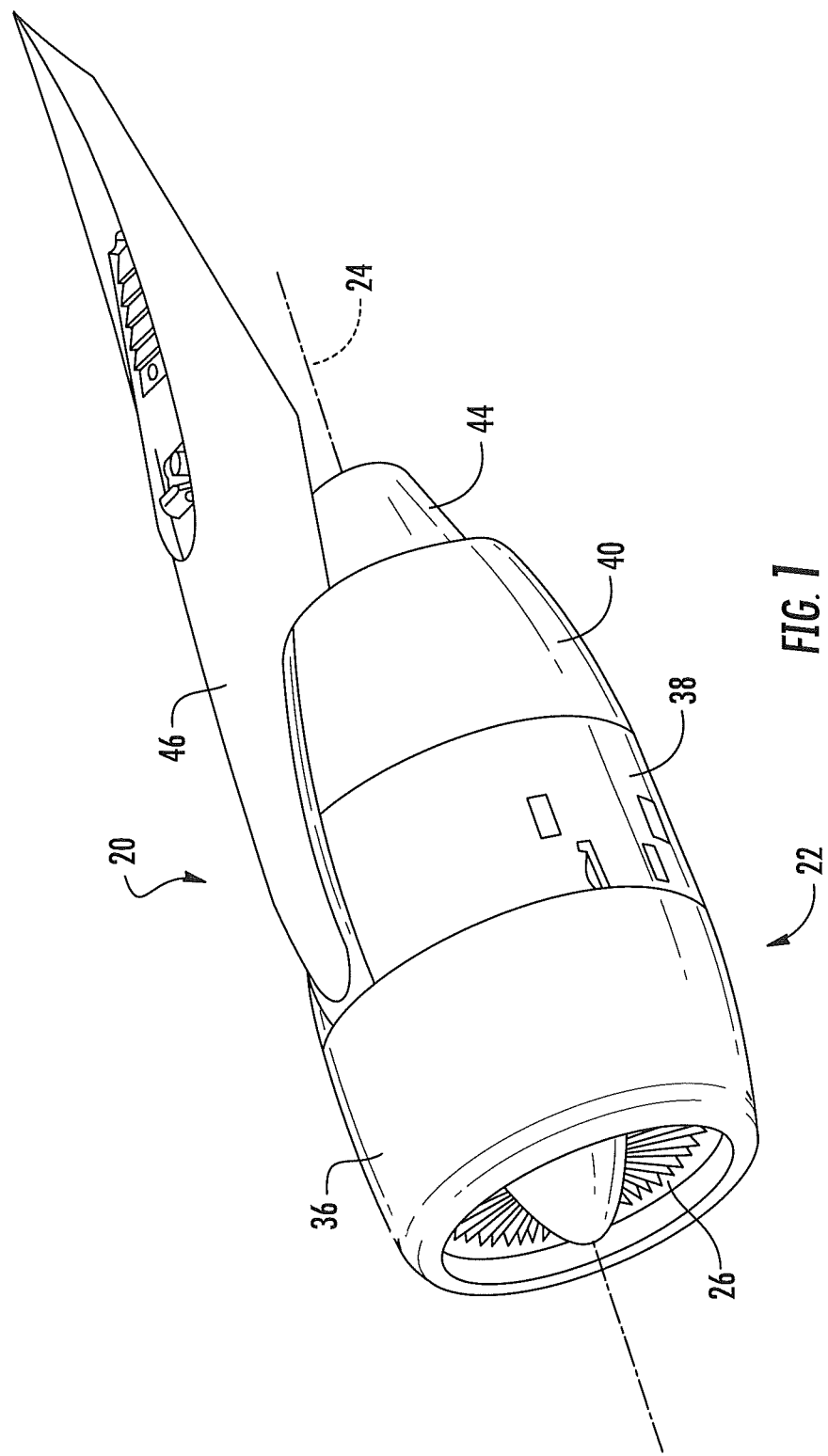
FIG. 1 is a perspective view of a turbofan engine of the present disclosure.
Figure 2:
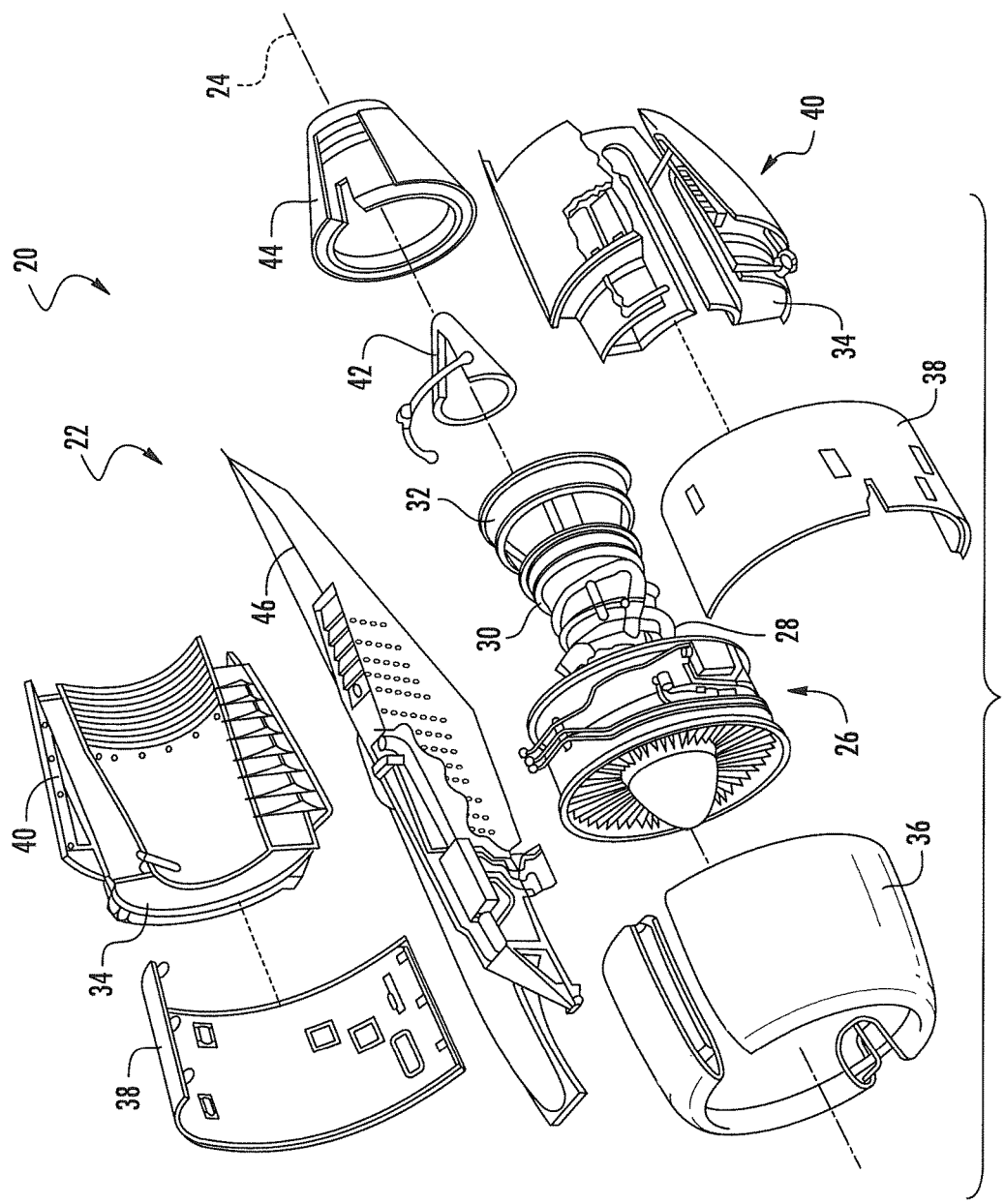
FIG. 2 is an exploded view of the turbofan engine.

Referring to FIGS. 1 and 2, a turbofan engine 20 is illustrated and includes a nacelle 22 having an intake cowl architecture of the present disclosure. The turbofan engine 20 is generally centered about an engine axis 24. The nacelle 22 generally surrounds an inner engine core. The engine core includes a fan section 26, a compressor section 28, a combustor section 30 and a turbine section 32. The fan section 26 drives a portion of incoming air (i.e., bypass air) along a bypass flowpath or duct 34, and drives a remaining portion of incoming air (i.e., engine core air) toward the compressor section 28. The core air flows along a core flowpath (not shown) that is generally located radially inward of the bypass flowpath 34. The core air is first compressed by the compressor section 28, then flows into the combustor section 30. The core air is mixed with fuel in the combustor section 30 and burned producing energy. The core air flows from the combustor section 30, is expanded through the turbine section 32 and, in-turn, drives a central shaft (not shown) that powers the fan section 26. The combusted core airflow generally powers the fan section 26 and the bypass airflow provides the majority of forward propulsion for the engine 20.

The nacelle 22 may include an inlet assembly 36 disposed forward of the fan section 26, an outer fan cowl 38 that circumferentially surrounds and shields the fan section 26, a thrust reverser 40, and a pylon 46 that supports the engine 20 typically to an underside of an aircraft wing (not shown). The thrust reverser 40 may circumferentially surround a portion of the compressor, the combustor and turbine sections 28, 30, 32, an exhaust centerbody 42 disposed aft of the turbine section 32, and an exhaust nozzle 44 that is spaced radially outward from the exhaust centerbody 42.

Figure 3:
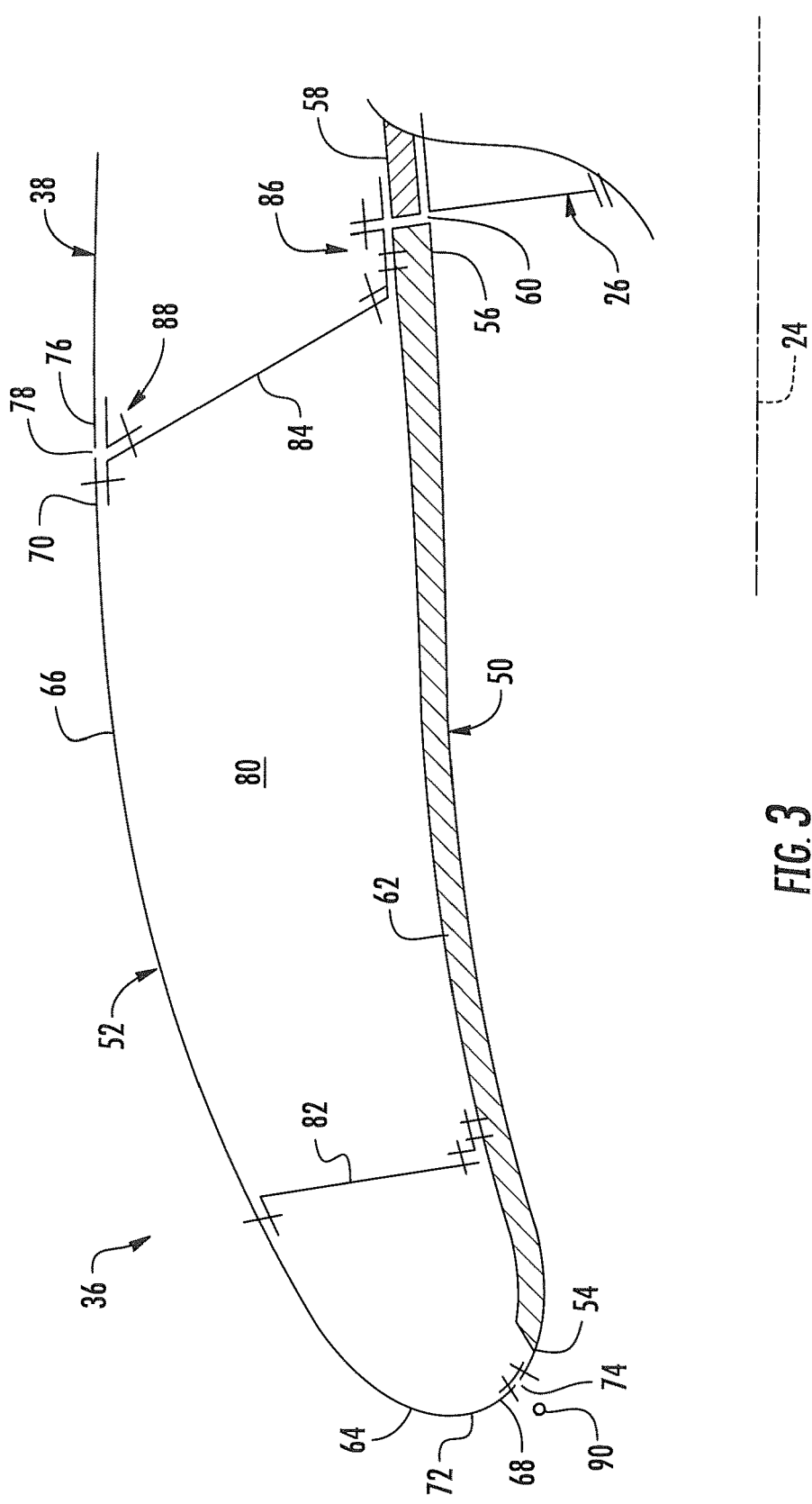
FIG. 3 is a partial cross section of an inlet assembly of a nacelle of the turbofan engine.

Referring to FIG. 3, the inlet assembly 36 of the nacelle 22 may include an inner barrel 50 and a nose lip 52. The inner barrel 50 may be substantially cylindrical and centered about axis 24. The inner barrel 50 includes and extends axially between forward and aft end portions 54, 56 that may be substantially ring shaped. The aft end portion 56 of the inner barrel 50 is engaged to a forward end portion of a fan case 58 of the fan section 26 at a split line 60 (i.e., seam). The fan case 58 may include shielding attributes generally known in the art. The inner barrel 50 may further include an acoustic feature 62 that attenuates and/or absorbs noise created by the fan and engine noise propagating out through the inlet assembly 36. The acoustic feature 62 extends substantially the entire axial length of the inner barrel (i.e., proximate to both end portions 54, 56) to optimize acoustic attenuation.

The nose lip 52 of the inlet assembly 36 is generally centered about axis 24 and generally disposed radially outward from the inner barrel 50. The nose lip 52 may include a substantially annular segment 64 and a substantially cylindrical segment 66 (i.e., a skirt) engaged to and projecting axially rearward from the annular segment 64. A cross section of the annular segment 64 may be arcuate with a convex surface facing substantially forward. The nose lip 52 includes and extends between forward and aft end portion 68, 70 with a forward-most mid-portion 72 there-between. The forward end portion 68 and the mid-portion 72 are part of the annular segment 64, and the aft end portion 70 is part of the cylindrical segment 66. The forward end portion 68 of the nose lip 52 is engaged to the forward end portion 54 of the inner barrel 50 at a split line 74, and the aft end portion 70 of the nose lip 52 is engaged to a forward end portion 76 of the outer fan cowl 38 at a split line 78. The mid-portion 72 may be located slightly axially forward of the forward end portion 68, and the rearward end portion 70 is located substantially axially rearward of both the mid-portion 72 and the forward end portion 68.

The nose lip 52 may be one homogenous and single piece at least in terms of the nose lip 52 spanning axially without split lines or separate pieces joined together. Similarly, the inner barrel 50 may be one single piece spanning axially without split lines. Although not illustrated, the nose lip 52 may be assembled with two or more portions spanning circumferentially. That is, the nose lip 52 is a single piece in terms of spanning axially, but may be two or more pieces in terms of spanning circumferentially (i.e., seams would span axially) to assist in assembly. The same seam orientation may be applied to the inner barrel 50.

Together, the fan case 58, the inner barrel 50, and the nose lip 52, may define a cavity 80 that may be substantially annular. For structural rigidity of the inlet assembly 36, forward and rearward bulkheads 82, 84 are located in the cavity 80. The forward bulkhead 82 is engaged to and spans between the nose lip 52 and the inner barrel 50, such that the split line 74 and the mid-portion 72 of the nose lip 52 are spaced axially forward of the forward bulkhead 82. The rearward bulkhead 84 is spaced axially rearward of the forward bulkhead 82.

The inlet assembly 36 may further include first and second connections 86, 88 that may be flange connections generally orientated within the cavity 80. The first connection 86 is spaced radially inward of the second connection 88 and functions to attach the aft end portion 56 of the inner barrel 50 to the forward end portion of the fan case 58 at the split line 60. The second connection 88 generally facilitates an attachment between the aft end portion 70 of the nose lip 52 to the rearward bulkhead 84, and may further facilitate contact achieved between a landing or flange like structure 89 of the bulkhead 88 and a forward end portion 76 of the outer fan cowl 38 at the split line 78. More specifically, the outer fan cowl 38 may be generally removable and may swing open and closed thus, respectively, lifting from and pushing against the landing 89. The rearward bulkhead 84 may be generally engaged to the connections 86, 88 and/or flanges of the connections. For example, the rearward bulkhead 84 may span between and may be directly engaged to the aft end portion 70 of the nose lip 52 and the aft end portion 56 of the inner barrel 50 proximate to the respective split lines 78, 60. It is further understood that other attachment orientations of the rearward bulkhead 84 may be applicable.

The split lines 60, 74 may generally represent a mechanical engagement between adjacent components. This mechanical engagement may be achieved through any variety of fasteners including rivets and/or combinations of fasteners and inner flanges. In addition to or alternatively, the adjacent components may be adhered and/or welded together along the split lines 60, 74.

During a manufacturing process, the nose lip 52 may be, for example, stamped or otherwise formed, as one unitary piece continuously extending circumferentially with respect to axis 24. Alternatively, the nose lip 52 may be assembled from at least two, separate, circumferentially extending parts that when assembled are circumferentially continuous. To simply the manufacturing process, the split line 74 is shifted axially forward when compared to more traditional designs. This novel location of the split line 74 has the effect of making the nose lip 52 less of a 'compound' arcuate shape, thereby, simplifying a stamping process. Moreover, the location of split 74 of the present disclosure enables the ability to manufacture a nose lip 52 having a segment or skirt 66 that projects axially rearward further than more traditional skirts without the requirement of an additional split line. In one embodiment, the skirt 66 may axially project continuously to the outer fan cowl 38.

In addition to simplifying or producing a more robust manufacturing process, the location of split line 74 is proximate to a stagnation point 90 determined/established at a pre-determined flight condition such as, for example, when the engine 20 is operating at cruising speed, or other flight condition with a critical impact (e.g., takeoff and/or landing). Because split lines (i.e., or the seams at the split lines) are not conducive for desired laminar flow, location of the split line 74 proximate to the stagnation point 90 does not negatively impact laminar flow when compared to more traditional designs, and thereby enhances aerodynamic performance and reduces noise. Moreover, having an axially continuous skirt 66 without any split lines further improves laminar flow, thereby enhancing aerodynamic performance and reducing noise. It is further contemplated and understood that the split line orientations of the present disclosure may further optimize structural integrity when compared to more traditional designs.

Benefits of the orientation of the split lines 60, 74, 78 reduces the number of split lines required in more traditional designs thereby simplifying manufacturing and optimizing structural integrity. The split line 74 location permits and/or simplifies manufacturing of the nose lip 52. Yet further, because the split line 74 is shifted axial forward and the split line 60 is shifted axially rearward when compared to more traditional designs, the inner barrel 50 is axially longer providing a greater surface area for the acoustic feature 62 to reduce or absorb noise (i.e., attenuates vibration).

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

I claim:

1. A nacelle for a turbofan engine comprising:
a fan case concentrically disposed about an axis;
an inner barrel projecting forward from and engaged to the fan case at a first split line; and
a nose lip engaged to the inner barrel at a second split line, and wherein the nose lip extends substantially radially outward directly from the second split line then substantially axially rearward as one unitary piece.

2. The nacelle set forth in claim 1, wherein the second split line is disposed proximate to a stagnation point.

3. The nacelle set forth in claim 1 further comprising:
a first bulkhead disposed between and engaged to the inner barrel and the nose lip.

4. The nacelle set forth in claim 3, wherein the first bulkhead is axially spaced rearward of the second split line and axially spaced forward of the first split line.

5. The nacelle set forth in claim 4 further comprising:
a fan cowl spaced radially outward from the fan case; and
a second bulkhead extending substantially radially between and proximate to the first split line and a third split line located where the nose lip meets the fan cowl.

6. The nacelle set forth in claim 5, wherein the second split line is disposed proximate to a stagnation point of the turbofan engine when operating at a pre-determined flight condition.

7. The nacelle set forth in claim 6, wherein the pre-determined flight condition is cruising speed.

8. The nacelle set forth in claim 2, wherein the fan case, the inner barrel and the nose lip define a generally annular cavity.

9. The nacelle set forth in claim 8 further comprising:
a first bulkhead disposed in the cavity, extending between and engaged to the nose lip and the inner barrel, and spaced axially rearward from the second split line.

10. The nacelle set forth in claim 9 further comprising:
a fan cowl spaced radially outward from the fan case; and
a second bulkhead disposed in the cavity, and extending between the first split line and a third split line located where the nose lip meets the fan cowl.

11. The nacelle set forth in claim 10 further comprising:
an inner flange connection disposed at the first split line for attaching the second bulkhead, the inner barrel, and the nose lip together; and
an outer flange connection disposed at the third split line for connecting the nose lip to the second bulkhead, and wherein the second bulkhead extends between the inner and outer flange connections.

12. The nacelle set forth in claim 11, wherein the outer flange connection is disposed axially forward of the inner flange connection.

13. The nacelle set forth in claim 12, wherein the outer flange connection includes a landing for contact with the fan cowl.

14. The nacelle set forth in claim 3, wherein the inner barrel is a one-piece inner barrel.

15. The nacelle set forth in claim 14, wherein the inner barrel includes an acoustic feature extending axially forward of the first bulkhead.

16. The nacelle set forth in claim 15, wherein the acoustic feature extends axially between and is proximate to the first and second split lines.

17. The nacelle set forth in claim 5, wherein the third split line is disposed axially forward of the first split line.

18. The nacelle set forth in claim 9, wherein the third split line is disposed axially forward of the first split line.

19. An inlet assembly for a turbofan engine comprising:
an inner barrel centered about an axis and including a forward end portion and a rearward end portion;
a nose lip extending circumferentially about the axis and including a forward end portion engaged to and extending at least in-part radially outward from the forward end portion of the inner barrel at a split line, and a rearward end portion projecting at least in-part axially rearward and spaced radially outward from the rearward end portion of the inner barrel; and
wherein the split line is proximate to a stagnation point of the turbofan engine when operating at a pre-determined flight condition.

20. The inlet assembly set forth in claim 19 further comprising:
a first bulkhead engaged to and spanning radially between the inner barrel and the nose lip, and wherein the split line is axially spaced forward of the first bulkhead; and
a second bulkhead engaged to and spanning radially between the aft end portion of the inner barrel and the aft end portion of the nose lip, and wherein the second bulkhead is axially spaced rearward from the first bulkhead.

* * * * *